United States Patent [19]
Noh

[11] Patent Number: 5,859,928
[45] Date of Patent: Jan. 12, 1999

[54] JITTER-FORM BACKGROUND CONTROL FOR MINIMIZING SPURIOUS GRAY CAST IN SCANNED IMAGES

[75] Inventor: Jae Jung Noh, San Diego, Calif.

[73] Assignee: Hewlett-Packard Company, Palo Alto, Calif.

[21] Appl. No.: 667,532

[22] Filed: Jun. 21, 1996

[51] Int. Cl.⁶ ..................................................... H04N 1/38
[52] U.S. Cl. .......................... 382/172; 382/270; 358/462; 358/466
[58] Field of Search .................................... 358/534, 538, 358/429, 465–466, 447, 462, 467; 382/172, 270, 260–265, 275, 176

[56] References Cited

U.S. PATENT DOCUMENTS

| | | | |
|---|---|---|---|
| 5,162,860 | 11/1992 | Nami et al. | 355/327 |
| 5,280,367 | 1/1994 | Zuniga | 358/462 |
| 5,339,368 | 8/1994 | Higgins-Luthman et al. | 382/56 |
| 5,383,033 | 1/1995 | Takahashi | 358/456 |
| 5,386,305 | 1/1995 | Usami | 358/518 |

*Primary Examiner*—Scott Rogers
*Assistant Examiner*—Stephen Brinich

[57] ABSTRACT

In acquiring and reproducing an image, my method and apparatus correct for spurious gray background. Image brightness is sensed in multiple regions of an original image, to provide a corresponding multiplicity of signals for use in reproducing the image. In response to the multiple signals, a corresponding multiplicity of corrected signals is provided by adjusting each signal. The amount of adjustment depends on the size of the signal, and preferably includes jitter—i. e., a random component. Preferably the random component is partially smoothed. The multiple corrected signals are used in reproduction of the image. Preferably the dependence of adjustment on signal size is a multivalued monotonic function. Preferably the function increases the brightness of image regions that are already relatively more bright, in comparison with image regions that are relatively less bright. Preferably the signals represent relative amounts of black, or darkness of a chromatic color; and for each signal a choice is made automatically between the greater of (1) zero and (2) a corresponding one of the multiple signals.

20 Claims, 6 Drawing Sheets

JITTER-FORM BACKGROUND CONTROL FOR MINIMIZING SPURIOUS GRAY CAST IN SCANNED IMAGES

RELATED PATENT DOCUMENTS

The color space preferably used for implementation of my invention is known as "hue plus gray" or "HPG" space and is described in U.S. Pat. No. 5,377,024 of Paul H. Dillinger.

FIELD OF THE INVENTION

This invention relates generally to desktop or drafting-room machines and procedures for acquiring an image in the form of data, most typically electronic or electromagnetic data bits—as for example by a process familiarly known as "scanning"—and for using the acquired image data in reproduction of the original image. Such "reproduction" more precisely encompasses forming an approximation of the original image.

Such reproduction may be by printing, as for instance on a sheet of printing medium, or by displaying the image approximation on an electronic display screen, or by incorporating the data into some sort of derivative image. Alternatively such reproduction may be by transmitting the data to a remote device such as a telefacsimile receiver for such printing, display etc.

CONTEXT OF THE INVENTION

The problem of background cast

In digital scanning and copying, particularly in color, most commonly an original image is fed into the scanning system in the form of markings on white paper or other white medium. To maintain detail in highlight areas of the actual image, it is important that such a system be able to discriminate between gray-scale tones that are very close to that background white.

Because of this constraint, ideally the highest level of brightness in the dynamic range of the system is set exactly to the background white of the paper or other medium. The highest level should be set no lower than the background white, as that would discard a part of the discrimination just mentioned; and of course no higher as that would waste part of the expensive dynamic range of the system.

Not all "white" paper, however, is equally bright, and even within a single piece of paper surface irregularities can displace the apparent reflectance of a region from the actual. Apart from these inherent departures of real-world images and media from a standardized conceptualization of the scanning process, the lighting can vary slightly, sensor arrays are imperfect, and the sensitivity of individual sensors may be slightly off calibration.

Furthermore, in practice illumination levels and sensor responses are not entirely static, but are subject to slight longterm and short-term drifts with excitation level, with cumulative optical energy and signal drain, with temperature and with other operating conditions. These very slight drifts are amplified in importance at the end of the dynamic range.

Thus white regions (pixels, for instance) may drift downward in brightness, making them appear gray, while gray regions may drift upward making them appear white or nearly so. The net result is some unavoidable degree of confusion or ambiguity in the overlapping gray-scale region between downward-drifting white and upward-drifting gray. In the aggregate, some portion of these departures from the ideal would persist even if each scanner automatically calibrated its own sensor array, in the context of its own illumination, for a standard white paper.

As a practical matter, the highest system level is generally set slightly too high for most white papers—thus preserving discrimination within highlights, at the cost of dynamic range. This choice makes sense in terms of acquiring the maximum amount of information in an image.

As an incidental result, however, it does produce—in the finished reproduction—a gray cast over background areas that should be pure white. This result is undesirable because a casual viewer, perhaps inadequately appreciative of the preservation of information content, instinctively perceives the finished product as lifeless (lacking the dynamism or snap of an image with bright highlights), or dingy, or even dirty.

Earlier solutions

An easy solution in system firmware is to set a threshold beyond which all gray levels are snapped to white. This approach is inadequate: it arbitrarily truncates the gray scale and thereby negates the original choice of maintaining information content. Where drifts have produced overlap between originally gray and originally white regions, this approach of course also cannot avoid snapping some originally gray pixels to white.

In other words, it discards the ability to discriminate among image gray levels, and between those levels and the pure white of the true background. Hardware discrimination capabilities, carefully preserved in the hardware design, are discarded in the firmware.

One particularly conspicuous adverse result is artifacts in the image, wherever shapes with grayness that is tailing-off spatially are truncated spatially, along with the gray-scale truncation. In this way gray-scale contours in the image are translated into conspicuously visible shapes—an undesirable phenomenon sometimes called "contouring".

Another solution, which is not prior art relative to the present invention, entails collecting a histogram of gray-scale values throughout an image. This information is then used to set the effective high-brightness end of the dynamic range of the system.

This approach may be the most genuine in terms of matching the dynamic ranges of the image and the system. It consumes, however, inordinate amounts of computation time and storage memory.

Furthermore this solution in effect calibrates one or both ends of the system dynamic range to the image dynamic range, and thus rests implicitly on assumptions about the regularity of gray-scale usage within the image. This paradigm may fail dramatically for an image whose distribution of gray-scale values, within its dynamic range, is unusual.

A previously unrelated technique

A known methodology which hitherto has not been associated with background correction is the concept of dithering.

In classical halftone printing (i. e., with a printing press), it is known to render gray-scale values by forming image regions as dots of different sizes—within a fixed grid, so that larger dots occupy a greater fraction of the region and so appear darker.

In multitone pixel-based printing, various techniques have been proposed for printing dots of various sizes and/or for overprinting various numbers of dots. This approach closely emulates classical halftoning, providing a spatial density that tracks the desired optical density.

In binary pixel-based image printing, where such halftoning technique is unavailable because all dots are the same size and the same in number per pixel, pixel inking has been controlled in pixel groups to provide a closely analogous effect. Here the system controls the number of pixels that are inked in each group (each with just one dot of a standard size), once again rendering each gray-scale value or optical density as a spatial density—but doing so perhaps over a somewhat greater spatial scale.

This latter case is known as "dithering". To avoid excessive regularity in spatial patterning, dithering is generally refined by use of a so-called dither cell which imposes a simulation of randomness in placement of the dots within each group. The result is a somewhat more subtle effect, reducing the degree to which systematic conversion of optical to spatial density is apparent to a casual observer.

Dithering does not necessarily map each pixel to its original value—and in fact it actually perturbs, or injects randomness or what may be called "noise" into, each pixel. Yet dithering approximately preserves intensity over a large area.

In the absence of all these variable-, multiple-, and fixed-size dot schemes for rendering continuous-tone images, it would be necessary to resolve every image into just solid black and solid white regions. Apart from use for special artistic effects, that is obviously a form of reproduction that is subject to very poor fidelity—and therefore an undesirable approach for, perhaps, everything but checkerboards and zebras.

Such black-and-white resolution techniques must sort all gray-scale values into black and white, and of course may translate even two very closely similar midscale gray values into black and white respectively. Thus dithering and other forms of halftoning are used to avoid overly sharp or abrupt cutoff, or tonal separation, as between two input values that are closely adjacent on the gray scale.

As mentioned above, dithering and other actual or simulated randomness in image reproduction have not hitherto been associated with the background-control problem addressed in this document.

Conclusion

Inability to provide subtle but effective background correction—with modest system and runtime demands—has continued to impede achievement of uniformly excellent scanned-image reproduction. Thus important aspects of the technology used in the field of the invention remain amenable to useful refinement.

SUMMARY OF THE DISCLOSURE

The present invention introduces such refinement. In its preferred embodiments, the present invention has several aspects or facets that can be used independently, although they are preferably employed together to optimize their benefits.

In preferred embodiments of a first of its facets or aspects, the invention is a method of image acquisition and reproduction—with correction for spurious gray background. The method includes the step of sensing image brightness in a multiplicity of regions of an image, to provide a corresponding multiplicity of signals for use in reproduction of the image.

The method also includes a step of—in response to the multiplicity of signals—generating a corresponding multiplicity of corrected signals. This generating step is performed by adjusting each signal by an amount that:

(1) depends on the size of that signal, respectively, and (2) includes jitter.

In addition the method includes the step of using the corrected multiplicity of signals in reproduction of the image. In other words, the result of the calculations is applied to control the physical steps of reproduction, and more specifically to control gray-scale or like tonal relations in the reproduction image.

The foregoing may constitute a description or definition of the first facet of the invention in its broadest or most general form. Even in this general form, however, it can be seen that this aspect of the invention significantly mitigates difficulties left unresolved in the art.

In particular, the signal-dependent component of the corrected signal enables application of a slight skew or "fudge factor" to individual image signals—but only those signals that represent gray-scale values relatively near the white background of the paper. Meanwhile the incorporation of jitter into the signals facilitates masking or concealment of the effects of that signal-dependent component, so that the background correction is reasonably subtle—i. e., without creation of conspicuous gray-scale discontinuities along constant-grayness contours in the original image.

Although this aspect of the invention in its broad form thus represents a significant advance in the art, it is preferably practiced in conjunction with certain other features or characteristics that further enhance enjoyment of overall benefits.

For example, it is preferred that the amount which depends on the size of the respective signal include a perturbation of each signal by a multivalued monotonic function of that respective signal. It is also preferred that the amount which includes jitter include a substantially random fluctuation of the perturbation—and this substantially random fluctuation, in turn, preferably is partially smoothed.

Preferably the image-brightness sensing step includes providing the corresponding multiplicity of signals in the form of signals representing relative amounts of black.

In preferred embodiments of a second of its independent aspects, the invention is not a method but rather an apparatus for image acquisition and reproduction, with correction for spurious gray background. The apparatus includes some means for sensing image brightness in a multiplicity of regions of an image.

For purposes of generality and breadth in discussing the invention, I will call these means the "brightness-sensing means". The brightness-sensing means operate to provide a corresponding multiplicity of signals for use in reproduction of the image.

In addition the apparatus includes some means, responsive to the multiplicity of signals, for generating a corresponding multiplicity of corrected signals. Again for breadth and generality these means will be called the "generating means"; they function by adjusting each signal by an amount which:

(1) depends on the size of that signal, respectively, and (2) includes jitter.

Preferred embodiments of this aspect of the invention also include some means for using the corrected multiplicity of signals in reproduction of the image—which will be called simply the "using means". As mentioned earlier, reproduction may be simply printing or displaying the image; or may instead be incorporating the image data into a derivative (e. g., composite) image; or may be by transmission to a remote device where any of these procedures may take place.

In any event the results of operating the preceding means are applied to control the apparatus which prints, displays or otherwise reproduces the image—in such a way as to establish the actual tonal values which appear.

The foregoing may constitute a description or definition of the second facet of the invention in its broadest or most general form. Even in this general form, however, it can be seen that this aspect of the invention too significantly mitigates the difficulties left unresolved in the art.

In particular, use of a signal-dependent correction enables displacement of near-white image values toward white, but with little or no perturbation of image values elsewhere in the gray scale. Use of jitter or joggling of the perturbation beneficially renders this value-dependent selective correction less conspicuous.

Although this second aspect of the invention in its broad form thus represents a significant advance in the art, it is preferably practiced in conjunction with certain other features or characteristics that further enhance enjoyment of overall benefits.

For example, it is preferred that the generating means include some means for making the signal-dependent amount increase the brightness of image regions that are already relatively more bright, in comparison with image regions that are relatively less bright. It is also preferred that the generating means include some means for partially smoothing the jitter.

Also preferably the using means include some means for (1) printing the image on the printing medium, or (2) using the signals in display or other representation of the image, or (3) transmitting the signals to a remote device for use in display, printing or other representation of the image by that device.

In preferred embodiments of a third basic aspect or facet, as in the second aspect, the invention is an apparatus for image acquisition and reproduction, with correction for spurious gray background. Also as in the second aspect, the apparatus here includes brightness-sensing means, and using or applying means.

The apparatus under discussion now, however, also includes some means, responsive to the multiplicity of signals, for adjusting each signal by a multivalued monotonic function of that signal, respectively, to generate a corresponding multiplicity of corrected signals. Please note that these "adjusting means" are differently defined than the generating means of the second facet of the invention.

Also, for purposes of this document the term "multivalued" does not mean that the function can have multiple values corresponding to any single value of an input signal. Rather the term "multivalued" is herein used to mean simply that the function takes on more than two values at various different input-signal values respectively.

Merely as an example, the function might be "five-valued", meaning that it takes on five different values for different input signals; for instance it might equal:

(a) four when the initial signal is one, (b) three if the signal is two or three, (c) two when the signal is four or five, (d) one if the signal is six, seven or eight, and (e) zero otherwise.

These values are only intended as an example of the meaning of "multivalued" as used in this document, not as representative values for actual use in my invention.

The foregoing may be a definition or description of the third aspect of the invention in its most general or broad form. Even in this general form, however, it can be seen that this aspect of the invention importantly advances the art.

In particular, even in the absence of jitter the use of a multivalued monotonic function—instead of a single step function—for adjusting the signals reduces the tendency for development of a sharply delineated gray-scale boundary where the original image graded to pure white.

As in the cases previously discussed, however, there are preferable additional features or characteristics. I prefer that the adjusting means include some means for making the multivalued monotonic function increase the brightness of image regions that are already relatively more bright, in comparison with image regions that are relatively less bright.

(It will be noted that the example of a five-valued function presented just above—assuming that the function values are subtracted from the initial input signal values—can generate negative corrected values, namely −3 when the initial signal is one. If the signals are stated in terms of quantity of black, this value corresponds to "whiter than white" and may seem anomalous. Actually it is very useful if jitter is incorporated into the system, since the jitter may displace the grayness in the opposite direction by some amount; thus the negative result just stated maintains continuity. For those cases in which the overall value resulting from both the function and jitter is negative, the invention can straight-forwardly limit the actually-used values to zero and greater.)

Also preferably the adjusting means include some means for superimposing a random fluctuation, or equivalent, upon said multivalued monotonic function. The adjusting means further preferably comprise means for partially smoothing the random fluctuation or equivalent.

I also prefer that the image-brightness sensing means include some means for providing the corresponding multiplicity of signals in the form of signals representing relative amounts of black colorant—as distinguished from signals representing relative brightness as such. It is additionally preferable that the adjusting means include some means for selecting, for each of said multiplicity of signals, between the greater of (1) zero and (2) a corresponding one of said multiplicity of corrected signals.

All of the foregoing operational principles and advantages of the present invention will be more fully appreciated upon consideration of the following detailed description, with reference to the appended drawings, of which:

DETAILED DESCRIPTION OF THE PREFERRED EMBODIMENTS

Figure 1:
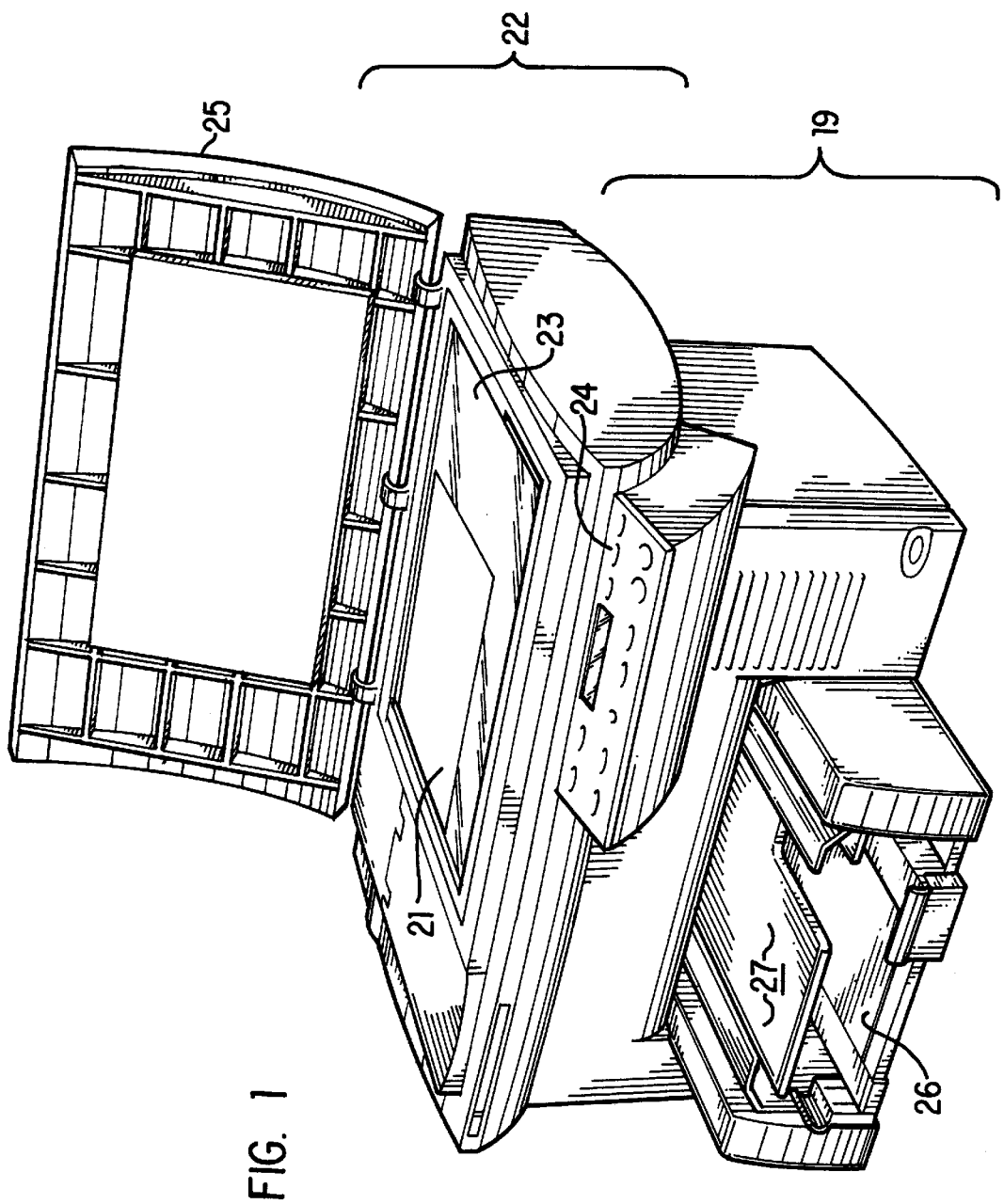
FIG. 1 is an exterior isometric or perspective view of a preferred embodiment of the invention which is a scanner/printer/copier, shown with its top cover open.

A representative preferred embodiment of my invention is a desktop device for reproducing a document 21 (FIG. 1). My invention is equally applicable, however, to systems which provide only a scanner function, or only a printing function—or which instead, or also, include facsimile transmission or facsimile reception, or both.

A representative embodiment typically has a scanner section 22 and a printer section 19. The scanner section may include a transparent flatbed 23 for receiving the face-down original 21—which may be a sheet of image-bearing medium, as shown, or a book or magazine, or other type of object.

My invention applies as well to many other systems, for example a flat-platen system in which the transparent document-carrying platen translates past the scanner. It is also applicable to a system in which a document sheet instead travels through a system of slides, rollers etc. past a narrow stationary scanning slot where an imaging system reads a pixel row at a time—or past a transverse scanner that reads a swath, etc.—or in which e. g. a swath scanning mechanism translates in two dimensions relative to a stationary image-bearing medium.

Thus the invention encompasses a very large, pixel-based scanner/printer/plotter such as is used in a modern drafting room, as well as a desktop scanner/copier/FAX for office and home use.

In a representative desktop system, the scanner section 22 and printer section 19 typically share a control panel 24. A flat-platen or flatbed system typically includes a hinged cover 25.

The printer section 19 representatively includes an input tray 26 for supplying sheets of printing medium, such as paper, to receive reproduced images—and an output tray 27 for receiving the same sheets 28 (FIG. 2) after the sheets have been imprinted with those images. My invention, however, equally encompasses embodiments that use a continuous roll of print medium.

A representative stationary-flatbed system may include a line scanner having a linear sensor array inside a flat case 31, with a slot 32 for entry of light from a document on the transparent bed 23. The case has wheels 33 and is translated mechanically as by a leadscrew 36.

For color scanning, the sensor array may include three different subarrays 12r, 12g, 12b (FIG. 5) with corresponding different spectral sensitivities imparted, for example, by respective filters—or with common spectral response but with a prism to separate colors spatially.

Alternatively a single array may be time shared by a rotationally stepping prism, or by pulsed light sources of different spectral content, etc. In a traveling-scanner flatbed system, signals from a linear array may be coupled to the system electronics 13 by a flexible ribbon cable 35 or equivalent.

Now as to the printing stage 19, any number of different pixel-based systems of the desktop-device art may be used as part of my invention—a representative system being inkjet printing. In that instance pens 41, preferably including a color pen and a black pen, ride in a carriage 42 along a support and guide rod 43. An encoder strip 44 enables determination of the carriage and pen position relative to the print-medium support system 26, 27—and to the associated transport system (not shown)—and thereby relative to each individual output sheet 28.

All these systems employ and embody one or preferably both of two techniques outlined in the preceding summary:

One technique is providing a jitter-modified incremental signal—in essence, what is sometimes called a "fudge factor" (or term), to move some gray-scale values closer to the pure white background of a piece of paper. The random component or jitter is important to prevent the result of the additive increment from being overly conspicuous.

In this first technique, it is also important that the incremental signal be dependent upon the input signal. Thus not all gray-scale values but only those which are initially close to white should be adjusted.

Here even the previously mentioned "inadequate solution" of snapping near-white values above a certain threshold to white—in essence a single-step, or two-valued monotonic function of the initial signal level—would be greatly ameliorated by inclusion of the jitter component. The jitter would significantly lessen the contouring problem.

The second technique is using a multivalued monotonic function of the initial signal level as an adjustment term. Here the snapping of near-white values above a single threshold to white would not qualify, but even without jitter considerable improvement in background correction could be achieved since the adjustment function in effect amounts to a system-response nonlinearity that is relatively smooth.

That is to say, values extremely close to white are snapped solidly to white; values slightly further from white are moved toward white to maintain intermediate gradation and thus minimize contouring. Values further yet from white are moved slightly toward white to couple the new near-white gradation with values which are initially slightly darker and therefore not adjusted at all.

The particular importance of this second technique is that it tends to maintain, and usually in fact actually enhances, highlight detail by retaining some gradation or contrast between values in the near-white part of the grayness scale. The multivalued monotonic function in essence increases the contrast—the slope of the system response—near white, in a relatively smooth way, without resorting to the extremely high contrast of a single step.

When these two techniques are used together, they produce a close approximation to the original image in its relation to an assumed white background. Throughout the image, including the near-white regions, relative intensity information is preserved with reasonably good fidelity; yet the "fudging" of the near-white distribution toward higher intensities produces a good approximation to white paper. Even the multivalued function could leave some residual contouring, depending on the particular gray-scale values and their geometrical distribution in the image, but the jitter effectively conceals this vestige of the systematic adjustment.

My invention is certainly not an abstraction, but for another perspective on its character can be represented conveniently in mathematical notation:

x=a single input gray-scale value (equivalently expressed either as brightness or darkness);

rand ( )=a "random"-number generator, operating over the range 0 through 255 inclusive;

g(x)=a monotonic, preferably multivalued (as defined earlier in this document), function of x; and j(x)=[rand( ) modulo g(x)]

which is the pseudorandom perturbation term. The modulo function is meant in the sense of a remainder, as will be explained in greater detail shortly.

Now if x is taken to be brightness or whiteness, $$x'=MIN[255, x+j(x)] = JBC(x).$$

Here the value 255 is taken as the maximum brightness value of which the system is capable, chosen for convenience of operation in an eight-bit digital processing system for handling numbers in binary form; the function j(x) should monotonically increase and is positive; and the positive sign "+" represents upward perturbation of the initial input signal x. The MIN function is used to truncate the corrected signal distribution at the end of the dynamic range.

The acronymic function JBC(x) is the entire Jitter-wise Background Control method or system in a nutshell. The JBC function perturbs high-brightness values upward, highest-brightness values being perturbed more than lower-brightness values.

Given an area or contour of uniform intensity, JBC(x) perturbs different pixels within that area or contour by varying amounts. The system thus abandons a pixel-wise fidelity while roughly maintaining a jitter-wise fidelity over the area or contour. White background is controlled, but in a way which is made subtle or inconspicuous by calculated introduction of jitter.

In practice it is particularly convenient to operate in terms of the quantity K of black, rather than the brightness or quantity of white. In this case the above expressions are all adapted for this change of coordinate system, thus—

$$K'=MAX[0,K-j(K)]$$

where K is the black equivalent of x, and K' is the result of JBC(K).

In this situation, for the monotonically increasing function g(K) I prefer to use the number (N+1) of binary bits in the largest power of 2 which is less than the input black signal K, or in mathematical notation—

$$2^N < K \leq 2^{N+1}$$

$$g(K)=2^{N+1} < 2K \leq 2^{N+2}$$

These relations do not define N for K=0; however, this discontinuity is unimportant since K=0 can be treated as a special case—but simply extrapolating the pattern that will be explained below.

In practice then the operation "modulo g(K)" consists of dividing by $2^{N+1}$ and discarding the fractional part of the resulting quotient, so that $j(K)=int[rand(\ )/2^{N+1}]$, the integral part of the quotient.

The character of the function g, or more precisely that of the composite function "modulo g", are chosen in large part for convenience of calculation, since the benefits of my invention are not strongly sensitive to the behavior of the function g or the hybrid "modulo g". In the now-preferred embodiment, using binary manipulation, this compound function is particularly fast and easy to execute, since it consists merely of shifting the output of rand( ) to the right through N+1 binary places.

The only other arithmetic operation needed is a single subtraction, applying the j(K) correction value to the initial input K to obtain, in effect, a tentative corrected output K'. If this tentative value is negative, the system clamps it to zero, implementing the "MAX" operator; otherwise the tentative value becomes an actual output.

Thus the correction term j(K)=rand( ) modulo g(K) is found, starting with the random number rand( ) expressed as a binary number, by shifting that binary number rightward through the number of binary bits in K—which may be found in a variety of ways, e. g., as the number of binary-place shifts required to reduce K to zero, or as eight minus the number of leading binary zeroes, etc.

As an example if rand( )=128 (which is approximately the average value of the random number) and K=24 (a gray-scale value somewhat near white, remembering that K=0 corresponds to pure white), then in binary form rand( )=binary 10000000 (decimal 128), K=binary 11000, and therefore g(x)=binary 10000 (or decimal $2^4$)

so

N=four—identifiable as $log_2 g$,

N+1=five bits in g(x)=>five shifts, and rand( ) modulo g(x)=binary 100

(binary 10000000 shifted five places to the right), which is decimal 4. In decimal terms therefore the average correction to K=24 is $j_{avg}(24)=4$, and the average corrected value for K=24 is:

$$K'_{avg}=MAX(0,24-4)=MAX(0,20)=20.$$

The average correction $j_{avg}(24)=4$, for the arbitrarily chosen example of K=24, thus pushes the input value four steps toward white, to the value $K'_{avg}=20$.

Since rand( ) can take on any value from 0 through 255 the above calculations can be performed for these limits, yielding respectively (at the same exemplary K=24):

$$24 \geq j(24) \geq 0,$$

$$17 \leq K'(24) < 24.$$

As can be seen, the corrected values range from $K'_{min}=17$ through $K'_{max}=24=K$, the original input value. Thus the invention cannot darken (raise the K value) of a pixel, but can lighten it.

The amount of lightening increases with proximity to white (K=0), demonstrable through similar calculations for selected values of K—yielding the adjustments and corrected values that are tabulated below. The selected figures show that, for example, any input K value from zero through eight can produce an output K' value ranging from zero (white) up through the same value as the input.

| K | $j_{avg}(K)$ | $K'_{min}$ | $K'_{avg}$ | $K'_{max}$ |
|---|---|---|---|---|
| 0 | 128 | 0 | 0 | 0 |
| 1 | 64 | 0 | 0 | 1 |
| 2 | 32 | 0 | 0 | 2 |
| 4 | 16 | 0 | 0 | 4 |
| 8 | 8 | 0 | 0 | 8 |
| 9 | 8 | 0 | 1 | 9 |
| 15 | 8 | 0 | 7 | 15 |
| 16 | 4 | 9 | 12 | 16 |
| 24 | 4 | 17 | 20 | 24 |
| 32 | 2 | 29 | 30 | 32 |
| 64 | 1 | 63 | 63 | 64 |
| 128 | 0 | 128 | 128 | 128 |

The maximum random variation in output values is fifteen units of blackness, from output value K'=0 through K'=15 (occurring at input value K=15) as shown in the seventh line of the tabulation body. Input values of K=128 and above, as can be seen, are not subject to adjustment.

As also shown, however, the transition from an adjustment range of fifteen units for K=15 down through an adjustment range of zero for K=128 is not abrupt but rather is a gradual tapering off. The range is seven units at K=16, three at K=32, and one at K=64.

Figure 3:
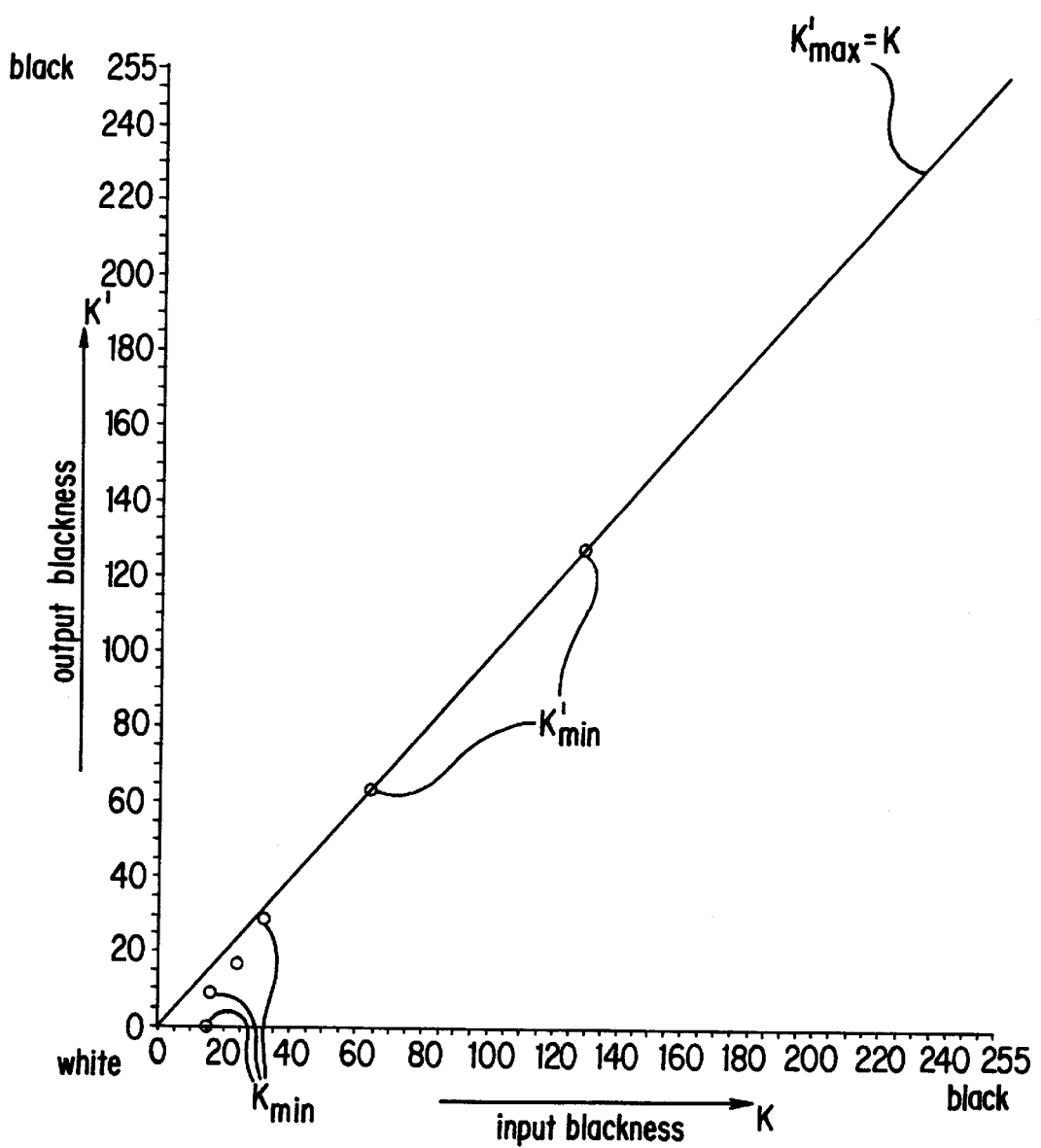
FIG. 3 is a graph that provides a rough conceptual showing of the operation of preferred embodiments of the invention.

FIG. 3 shows the maximum output blackness $K'_{max}$ as a continuous rectilinear function of the input blackness K, with unity slope. Thus as already explained $K'_{max}=K$, which is to say that my invention never increases the fraction of black, i. e. never lowers whiteness.

Several key values of $K'_{min}$ from the above tabulation are also plotted in FIG. 3 as small circles. The pattern of these plotted points turns down strongly, diverging from $K'_{max}$— which is to say from the uncorrected nominal input values K—as the input K approaches zero.

All actual values of K' must fall between the maximum and minimum extrema, or in other words between the solid straight 45° line and a downward-stepped line (not drawn in) that implicitly connects the small circles. Within this asymmetrical envelope, the exact location of each K' value is determined on a statistical basis by the random number rand( ) used in determining K'.

FIG. 3 may be understood as a graph of relative system contrast, its slope representing actual output increments (for use in a reproduction) vs. actual input increments in the acquired image. Thus the downturn in the sequence of small circles represents a very significant increase in relative contrast near white—for those K' points that happen to fall, within the envelope, closer to the downturning minimum than to the constant-slope maximum.

Even points positioned by, for example, an average jitter value are subject to a marked increase in relative contrast. The average values are, very generally speaking, vertically halfway between the maximum line and the entire minimum series of circles.

(In order to suggest such "halfway" points in FIG. 3, it may be helpful to visualize the series of small circles proceeding below zero, representing a sort of virtual lower limit. To avoid confusion, however, they have not been plotted, inasmuch as the actual outputs are clamped to a minimum value of zero.)

These relative-contrast increases mean that highlight detail is actually enhanced near white, while conspicuous gray background cast is avoided. Both these effects may be regarded as only statistical, or only tendencies, since some points will still fall close to the upper-limit line (i. e., the original K input value).

Over any large number of points, however, both effects are definitely present. They very strongly improve the subjective overall appearance of actual reproduction images, as well as the objectively evaluated output data distributions.

A satisfactory random-number or pseudorandom-number generator for production of the values rand( ) can be provided by any of several alternative methods. In any event the generator should be arranged to scale the output between zero and 255 for operation of the procedure as already described.

One method is to pretabulate a sizable quantity of substantially random numbers, in substantially random sequence, and then during operation select values from the tabulation in sequence. This approach is fast and simple, but does require sizable storage space.

The storage requirement is very important because the sequence of values taken systematically from any pretabulation will eventually repeat. The frequency of any such repetition can interact with (beat against) subtle repetitive structures in the data.

When this happens the result is artifacts, spurious but quite conspicuous interference patterns analogous to moiré patterns, in the output reproduction image. Such phenomena are avoided by providing a tabulation that is quite large, so that repetition cannot occur within a data sequence corresponding to hundreds or preferably thousands of pixel rows.

Pretabulation may be the best method in some contexts where storage is not an issue, as for example when the invention is implemented in a general-purpose computer with multimegabyte permanent memory. I prefer, however, to obtain random numbers with very little memory by providing or emulating operation of a shift register.

A shift register, or a counter formed from one or more such registers, inherently can generate an extremely long pseudorandom sequence and can be used for providing adequately random values rand( ). Such a device eventually repeats, just as a pretabulation does, and the number sequence produced is actually predetermined by the functional character of the device—but these theoretical flaws can be made immaterial by selecting a design in which the repetition frequency is adequately low.

Some designs are shown by, for example, Peter Alfke in Xilinx application note of August 1995, "Efficient Shift Registers, LFSR Counters, and Long Pseudo-Random Sequence Generators" (Xilinx, Inc., San Jose, Calif.). As Alfke observes, a relatively modest counter can provide "a repetition period many billion times longer than the life of the universe," and this will plainly suffice.

In practice of course far smaller devices are more than adequate. These systems are fast and economical but if preferred their operation can instead be emulated in firmware of a scanner or copier microprocessor, with some loss of throughput.

A table, shift-register or emulator provides pseudorandom numbers that are ready for use in the procedure described above, but I prefer to smooth them first. The result is to reduce relatively high-frequency noise in the image, thereby slightly improving image quality.

Smoothing can be obtained simply by averaging several successive values from the number generator, preferably using a number of values that is a power of two so that only shifts are needed to do the averaging. For example:

frand( )=a filtered value of rand( )$_i$=[rand( )$_{i-3}$+rand( )$_{i-2}$+rand( )$_{i-1}$+rand( )$_i$]/4.

I prefer, however, to further cushion the impact of newly entering values rand( )$_i$—as well as that of newly exited values rand( )$_{i-4}$—by applying lesser weights to the first and last values included in the average, as for example:

frand( )$_i$=[8rand( )$_{i-3}$+16rand( )$_{i-2}$+16rand( )$_{i-1}$+16rand( )$_{i-1}$+ 8rand( )$_i$]/64.

This arrangement for weighting preserves the use of powers of two for all multiples (eight and sixteen) as well as the divisor (sixty-four)—while also demonstrating that a number of values (five) intermediate between powers of two can be selected to achieve almost any preferred degree of smoothing.

Such smoothing produces a modified pseudorandom behavior whose relationship to white noise is diminished, and which Qian Lin, of Hewlett Packard Laboratories, has called "red noise".

Figure 4:
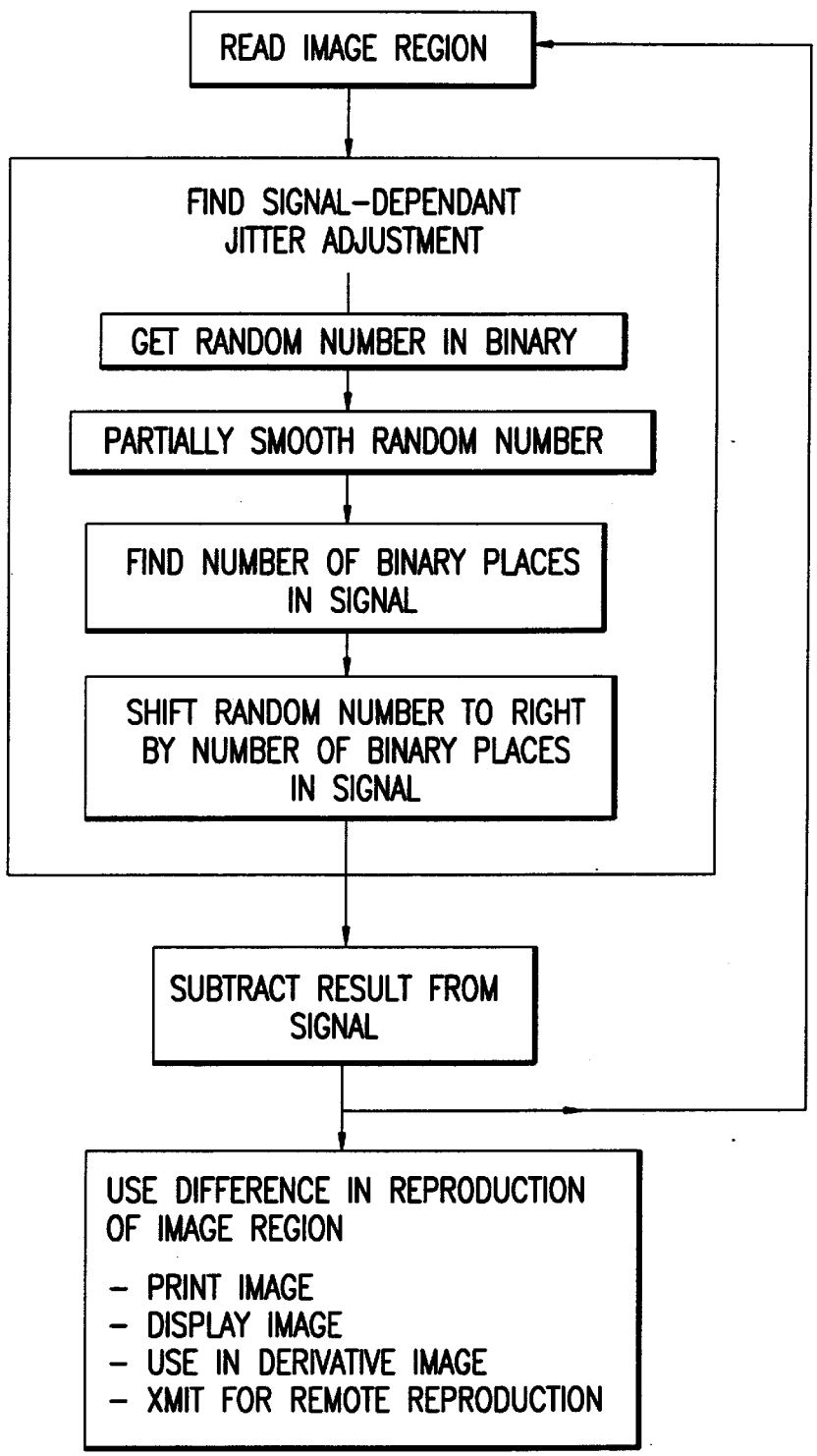
FIG. 4 is a flow chart showing the operation of preferred method embodiments of the invention.

All the procedures introduced above are summarized in FIG. 4, which in view of the foregoing discussion will be self explanatory to those skilled in this field. Some additional relationship between the apparatus discussed above and the language of certain of the appended claims is presented in FIG. 5.

That drawing includes individual sensors 12r, 12g, 12b for developing initial input signals RGB representing three additive colors in the input image. These signals pass into a microprocessor module 13, where they are preferably first converted to coordinates "fraction black" K, "fraction colorant" N, and "hue" H, in a microprocessor/firmware module 14 provided for this purpose.

Figure 5:
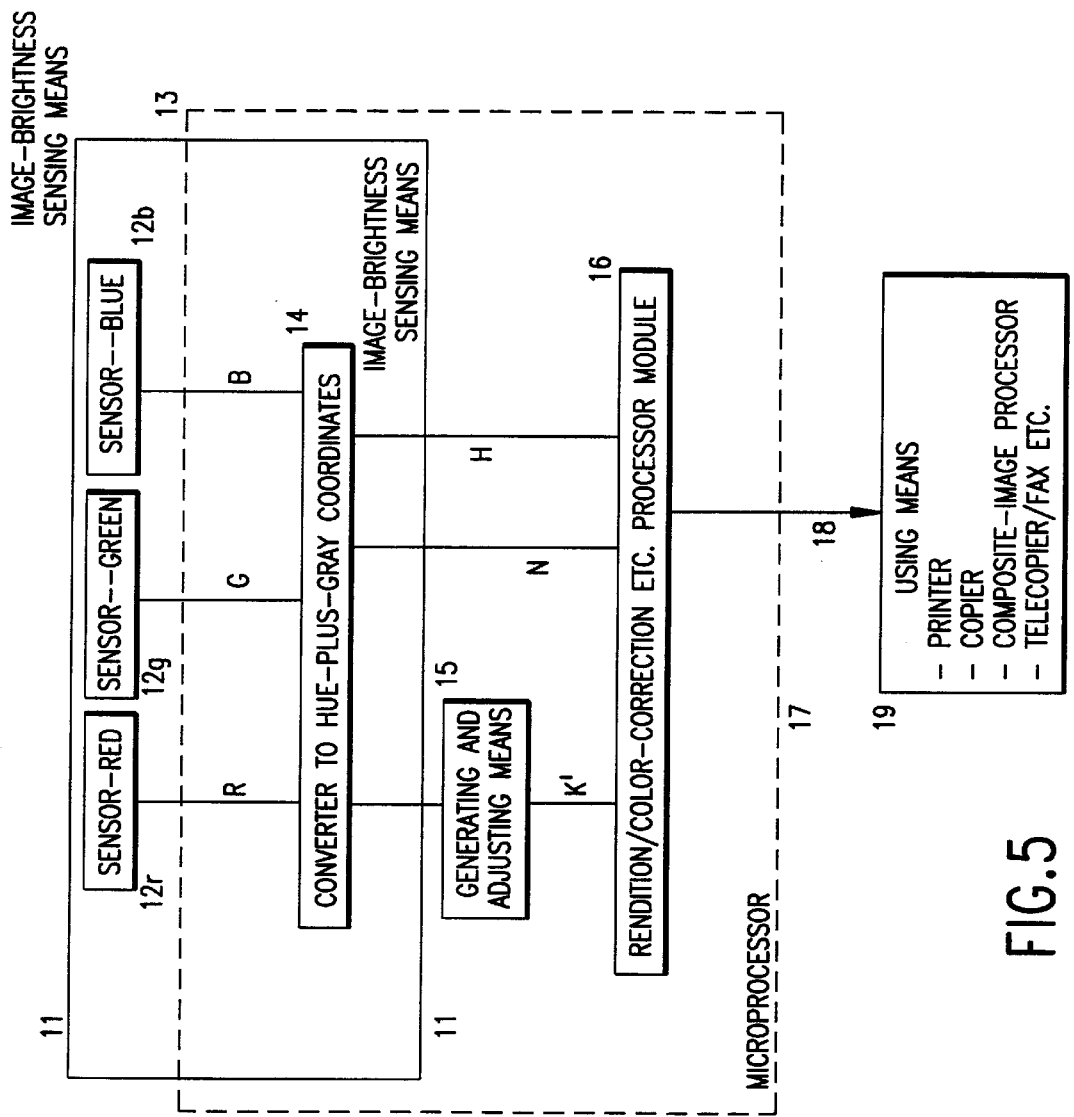
FIG. 5 is a schematic or conceptual block diagram of hardware for the FIG. 1 embodiment.

As FIG. 5 suggests, the converter module 14 may be regarded as a part—along with the three sensors—of the image-brightness sensing means 11. The converter 14 operates in accordance with simple arithmetic relationships set forth in the previously mentioned patent of Paul H. Dillinger.

At least the resulting black signal K passes next to the generating and adjusting means 15, which preferably provide the jitter-camouflaged multivalued monotonic function of the input black signal K as a subtractive adjustment to that signal. The generating and adjusting means perform that subtraction and thus emit the corrected black level K'=JBC (K).

This corrected signal K' then rejoins the N and H variables in the general sequence of processing modules, proceeding next to a microprocessor/firmware module or group of modules 16. Processing here may as appropriate include for example color correction, rendition, and any necessary variable transformation for development of an interface or driver signal 18 that passes to the using means 19.

At least in principle, portions of the work of my generating and adjusting means may be consolidated with the tasks which FIG. 5 shows allocated to the downstream module 16. In particular where color correction, rendition or related functions in module 16 are performed by lookup tables, some of the adjustment calculations of my present invention may be incorporated into such tables.

Such incorporation may make it possible to avoid or minimize the time and cost of practicing my invention in the form of one or more additional steps performed separately, as previously detailed above. This consolidated methodology is an equivalent within the scope of the appended claims.

Figure 2:
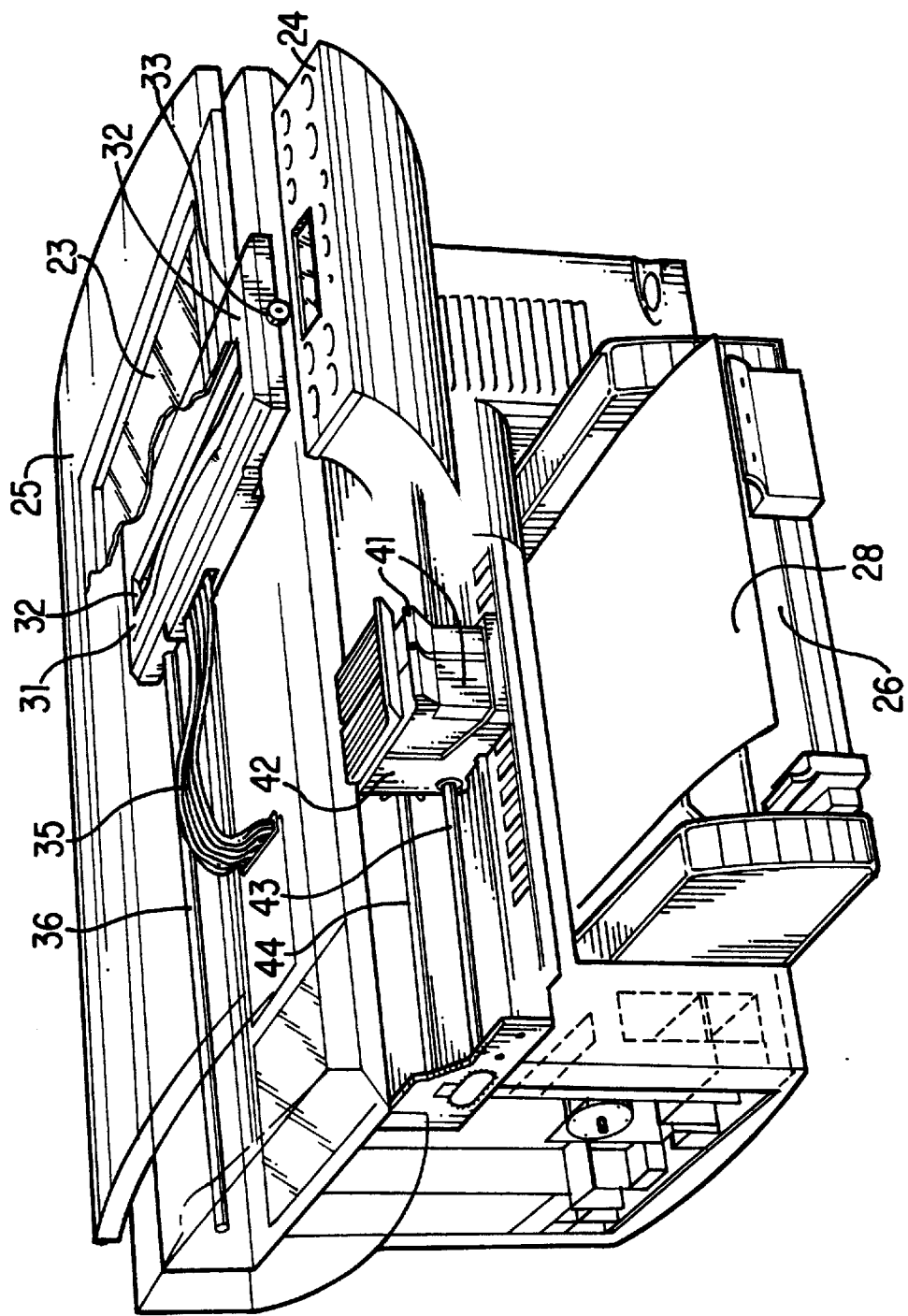
FIG. 2 is an isometric or perspective drawing of the FIG. 1 embodiment with its top cover closed, but with the cover and upper enclosure drawn partially broken away and faded away to show optical and mechanical modules within.

A representative optical system for use in acquiring image data from a document or object 21 (FIG. 6), for practice of my invention, includes a transparent flatbed or platen 23 and below it a moving case 31 with slot 32—all corresponding to the previously discussed like-numbered elements in FIGS. 1 and 2. Within the case and just below the slot 32 is a lamp 41 which emits light 42 upward toward the slot 32 and also laterally to a mirror 43.

The mirror reflects received light upward, adding additional light 42 to the illumination passing upward to and through the slot 32, and through the pane 23 to the document etc. 21. Light carrying visual details of the object, e. g. document, passes as a beam of light 44 downward through a second slot 45 in the lamp assembly and so into an interior compartment of the traveling case 31.

Within that compartment the light is reflected from a series of folding mirrors 46, thus forming a convoluted beam 47 having a long path that leads to a lens 48. Beyond the lens is a short path 49 to a CCD array 12 or like sensor arrangement.

The path-length relationships establish suitable demagnification of visual details from the object 21, at the much smaller sensors 12. As mentioned earlier, a color system includes suitable means for spatial or temporal separation of colors in the light 44—47—49 approaching the sensor array 12.

Figure 6:
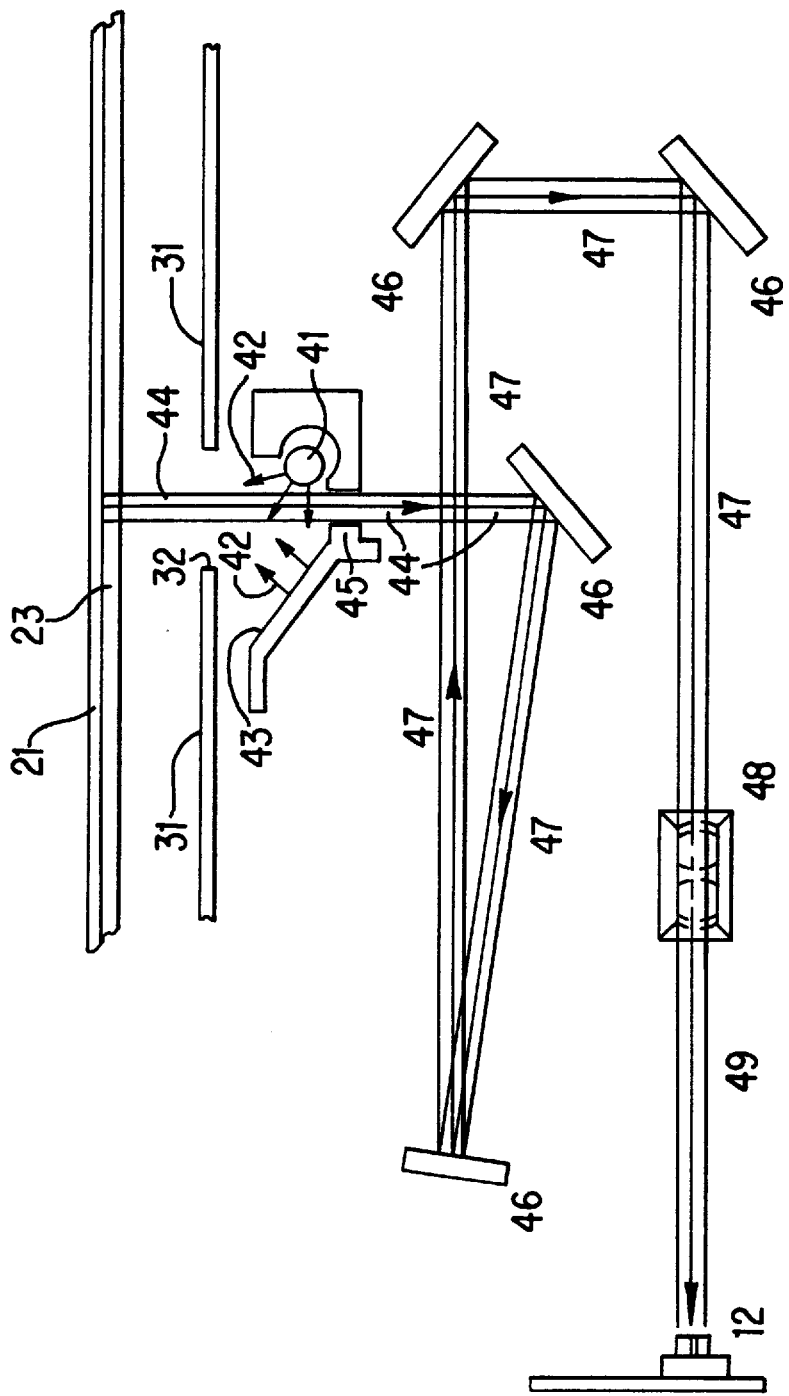
FIG. 6 is a very schematic diagram showing some of the optical system in the same embodiment.

One alternative to the system of FIG. 6 is a swath scanner. Among many other configurations, such a scanner may be disposed below the same flatbed 23. That type of scanner may be mounted for stepped longitudinal movement, generally as shown in FIG. 2, as well as transverse movement e. g. within the case 31, in the manner of a swath scanner.

To this point, my invention has been described in terms of preferred embodiments that directly address the most important part of the background-correction problem, namely the development of a gray cast in areas that should be white. When the problem is stated in this way, it can be seen that it is most closely related to the magnitude of the achromatic component of color in an image, which is to say the component that can be represented as quantity of black ink.

For this reason background correction is most effectively undertaken after representing the input image in the HPG color space which is introduced in the previously mentioned patent of Paul H. Dillinger. Quantity of black color is one of the dimensions of that color space; hence in that space the black colorant which makes up the greatest and visually most-significant part of the background cast is directly and readily manipulated.

It is possible, however, to address very nearly the same approach to gray-scale value using other color spaces such as the well-known LAB space. Using "lightness" in this space (or even in the HPG space if it is preferred to manipulate the quantity of white instead of the quantity of black), the methodology discussed in this document for dealing with "brightness" is appropriate—with, as mentioned earlier, a choice of some computationally more-convenient function g(x), and/or more-convenient compound function in place of "modulo g(x)".

Alternatively the procedures described above can be performed using a function such as "unity minus lightness fraction". Normalized to an eight-bit data-processing system this can be expressed as "255—lightness".

Still further the invention is applicable to addressing the background-correction problem in terms of the chromatic components of a color image, in addition to or even instead of maneuvering in the gray scale. In image areas that should be white, some cast may appear that is chromatic—though most often lighter and therefore relatively less conspicuous than a gray cast.

Accordingly if desired the same methodology described in detail for manipulating black colorant can be applied to chromatic colorants such as typically the subtractive primaries cyan (C) and magenta (M)—and even yellow (Y), although this primary is the lightest in grayness equivalent and therefore perhaps usually least offensive. In a CMYK system that corrects quantity of black directly, chromatic correction may be expected to serve only as a very small final refinement, or fine adjustment.

In a system that cannot readily address the gray-scale corrections directly, however, my invention can still be used. Such a system for example may be one that does not use HPG and that controls only cyan, magenta and yellow as dimensions (a CMY system).

One way to use my invention in such a system is to calculate from the quantities of cyan, magenta and yellow what the implicit quantity of black is—and then manipulate that quantity to obtain a corrected quantity of black as discussed above. Then from the corrected quantity of black (or the size of the correction) the system can calculate adjustments to the individual CMY quantities.

This approach in effect temporarily transforms the system signals into the HPG color space, performs the necessary arithmetic, and then transforms the results back into the design color space of the CMY system. Accordingly it is unduly cumbersome, though entirely workable.

A more-direct approach for CMY systems may be simply to perform the procedures described above for each of the three primaries CMY, or at least the darker two of them CM. Calculations and adjustments can be carried out independently for the two or three primaries to be adjusted, but if desired some of the processing may be coordinated —as for example by using the same values of the pseudorandom numbers rand( ) in obtaining both or all three of the adjustments j(C), j(M), j(Y) for each color triplet.

My invention can be practiced even in additive systems such as usually arise directly from sensor signals in red, green and blue (RGB) channels. For example this can be done after first finding the quantity of black color as 1—MAX(R,G,B), or in eight-bit digital processor terms 2550—MAX(R,G,B), which quantity can then be manipulated as described above to obtain black correction values.

The corrections can then be redistributed into the RGB channels. Again, however, this amounts to temporarily transforming the system parameters into HPG coordinates, and then restoring the signals to the RGB design color space—workable but cumbersome, since more-general use of the HPG space would facilitate various other operations of the system.

The above disclosure is intended as merely exemplary, and not to limit the scope of the invention—which is to be determined by reference to the appended claims.

What is claimed is:

1. A method of graphical-image acquisition and reproduction with correction for spurious gray background; said method comprising the steps of:

sensing image brightness in a multiplicity of regions of an image, to provide a corresponding multiplicity of signals for use in reproduction of the image;

in response to the multiplicity of signals, generating a corresponding multiplicity of corrected signals by adjusting each signal by an amount which:
(1) depends on the size of that signal, respectively, and
(2) includes jitter; and then using the corrected multiplicity of signals in color correction, or rendition, or both, preliminary to reproduction of the image.

2. The method of claim 1, wherein:

the image-brightness sensing step comprises providing said corresponding multiplicity of signals in the form of signals representing relative amounts of black.

3. A method of image acquisition and reproduction with correction for spurious gray background; said method comprising the steps of:

sensing image brightness in a multiplicity of regions of an image, to provide a corresponding multiplicity of signals for use in reproduction of the image;

in response to the multiplicity of signals, generating a corresponding multiplicity of corrected signals by adjusting each signal by an amount which:
(1) depends on the size of that signal, respectively, and
(2) includes litter; and using the corrected multiplicity of signals in reproduction of the image; and wherein:
the amount which depends on the size of the respective signal comprises a perturbation of each signal by a multivalued monotonic function of that respective signal.

4. The method of claim 3, wherein:

the amount which includes jitter comprises a substantially random fluctuation of the perturbation.

5. A method of image acquisition and reproduction with correction for spurious gray background; said method comprising the steps of:

sensing image brightness in a multiplicity of regions of an image, to provide a corresponding multiplicity of signals for use in reproduction of the image;

in response to the multiplicity of signals, generating a corresponding multiplicity of corrected signals by adjusting each signal by an amount which:
(1) depends on the size of that signal, respectively, and
(2) includes jitter; and using the corrected multiplicity of signals in reproduction of the image; and wherein:
the amount which depends on the size of the respective signal comprises a perturbation of each signal by a multivalued monotonic function of that respective signal;
the amount which includes jitter comprises a substantially random fluctuation of the perturbation; and
the substantially random fluctuation is partially smoothed.

6. A method of image acquisition and reproduction with correction for spurious gray background; said method comprising the steps of:

sensing image brightness in a multiplicity of regions of an image, to provide a corresponding multiplicity of signals for use in reproduction of the image:

in response to the multiplicity of signals, generating a corresponding multiplicity of corrected signals by adjusting each signal by an amount which:
(1) depends on the size of that signal, respectively, and
(2) includes jitter; and using the corrected multiplicity of signals in reproduction of the image; and wherein:
the amount which includes jitter comprises a substantially random, but partially smoothed, fluctuation.

7. An apparatus for graphical-image acquisition and reproduction, with correction for spurious gray background; said apparatus comprising:

means for sensing image brightness in a multiplicity of regions of an image, to provide a corresponding multiplicity of signals for use in reproduction of the image;

means, responsive to the multiplicity of signals, for generating a corresponding multiplicity of corrected signals by adjusting each signal by an amount which:
(1) depends on the size of that signal, respectively, and
(2) includes jitter; and means for using the corrected multiplicity of signals in color correction, or rendition, or both, preliminary to reproduction of the image.

8. The apparatus of claim 7, wherein:

the generating means comprise means for making the signal-dependent amount increase the brightness of image regions that are already relatively more bright, in comparison with image regions that are relatively less bright.

9. The apparatus of claim 7, for use with a printing medium, and wherein:

the using means comprise means for printing the image on the printing medium.

10. The apparatus of claim 7, wherein:

the using means comprise means for using the signals in display or other representation of the image.

11. The apparatus of claim 7, wherein:

the using means comprise means for transmitting the signals to a remote device for use in display, printing or other representation of the image by that device.

12. An apparatus for image acquisition and reproduction, with correction for spurious gray background; said apparatus comprising:

means for sensing image brightness in a multiplicity of regions of an image, to provide a corresponding multiplicity of signals for use in reproduction of the image;

means, responsive to the multiplicity of signals, for generating a corresponding multiplicity of corrected signals by adjusting each signal by an amount which:
(1) depends on the size of that signal, respectively, and
(2) includes jitter; and means for using the corrected multiplicity of signals in reproduction of the image; and wherein:
the generating means comprise means for partially smoothing the jitter.

13. An apparatus for image acquisition and reproduction, with correction for spurious gray background; said apparatus comprising:
   means for sensing image brightness in a multiplicity of regions of an image, to provide a corresponding multiplicity of signals for use in reproduction of the image;
   means, responsive to the multiplicity of signals, for adjusting each signal by a multivalued monotonic function of that signal, respectively, to generate a corresponding multiplicity of corrected signals; and
   means for using the corrected multiplicity of signals in reproduction of the image.

14. The apparatus of claim 13, wherein:
   the adjusting means comprise means for making the multivalued monotonic function increase the brightness of image regions that are already relatively more bright, in comparison with image regions that are relatively less bright.

15. The apparatus of claim 14, wherein:
   the adjusting means comprise means for superimposing a random fluctuation, or equivalent, upon said multivalued monotonic function.

16. The apparatus of claim 13, wherein:
   the adjusting means comprise means for superimposing a random fluctuation, or equivalent, upon said multivalued monotonic function.

17. The apparatus of claim 13, wherein:
   the image-brightness sensing means comprise means for providing said corresponding multiplicity of signals in the form of signals representing relative amounts of black.

18. An apparatus for image acquisition and reproduction, with correction for spurious gray background; said apparatus comprising:
   means for sensing image brightness in a multiplicity of regions of an image, to provide a corresponding multiplicity of signals for use in reproduction of the image;
   means, responsive to the multiplicity of signals, for adjusting each signal by a multivalued monotonic function of that signal, respectively, to generate a corresponding multiplicity of corrected signals; and
   means for using the corrected multiplicity of signals in reproduction of the image; and wherein:
      the adjusting means comprise means for superimposing a random fluctuation, or equivalent, upon said multivalued monotonic function: and
      the adjusting means further comprise means for partially smoothing the random fluctuation or equivalent.

19. The apparatus of claim 18, wherein:
   the image-brightness sensing means comprise means for providing said corresponding multiplicity of signals in the form of signals representing relative amounts of black.

20. The apparatus of claim 19, wherein:
   the adjusting means comprise means for selecting, for each of said multiplicity of signals, between the greater of (1) zero and (2) a corresponding one of said multiplicity of corrected signals.

* * * * *

UNITED STATES PATENT AND TRADEMARK OFFICE
CERTIFICATE OF CORRECTION

PATENT NO. : 5,859,928
DATED : January 12, 1999
INVENTOR(S) : Jae Jung Noh

It is certified that error appears in the above-identified patent and that said Letters Patent is hereby corrected as shown below:

At Column 15, line 42, after "includes", delete "litter" and insert in lieu thereof --jitter--.

Signed and Sealed this

Twenty-fifth Day of May, 1999

Attest:

Q. TODD DICKINSON

Attesting Officer

Acting Commissioner of Patents and Trademarks